(12) United States Patent
Jäger et al.

(10) Patent No.: US 10,850,924 B1
(45) Date of Patent: Dec. 1, 2020

(54) ROD BELT FOR ROD BELT CONVEYOR

(71) Applicant: Arnold Jäger Holding GmbH, Hannover (DE)

(72) Inventors: Sebastian Jäger, Hannover (DE); Jessica Tamra Reed, Sandstone, MN (US)

(73) Assignee: ARNOLD JAGER HOLDING GMBH, Hanover (DE)

(*) Notice: Subject to any disclaimer, the term of this patent is extended or adjusted under 35 U.S.C. 154(b) by 0 days.

(21) Appl. No.: 16/505,183

(22) Filed: Jul. 8, 2019

(51) Int. Cl.
*B65G 15/52* (2006.01)
*A01D 17/10* (2006.01)
*B65G 17/42* (2006.01)
*B65G 17/06* (2006.01)

(52) U.S. Cl.
CPC ............. *B65G 15/52* (2013.01); *A01D 17/10* (2013.01); *B65G 17/063* (2013.01); *B65G 17/42* (2013.01); *A01D 2017/103* (2013.01); *B65G 2201/0202* (2013.01)

(58) Field of Classification Search
CPC ...... B65G 15/52; B65G 17/063; B65G 17/42; B65G 2201/0202; A01D 17/10; A01D 2017/103
See application file for complete search history.

(56) References Cited

U.S. PATENT DOCUMENTS

| | | | | |
|---|---|---|---|---|
| 4,815,587 A * | 3/1989 | Musil | ...................... | B65G 15/52 198/728 |
| 4,892,509 A * | 1/1990 | Jager | ...................... | A01D 17/10 474/237 |
| 5,020,658 A * | 6/1991 | Jager | ...................... | A01D 17/10 198/844.2 |
| 5,088,177 A * | 2/1992 | Jager | ...................... | A01D 17/10 198/850 |
| 9,033,139 B2 * | 5/2015 | Jager | ...................... | B65G 15/48 198/850 |

* cited by examiner

*Primary Examiner* — Gene O Crawford
*Assistant Examiner* — Keith R Campbell
(74) *Attorney, Agent, or Firm* — Vedder Price P.C.

(57) ABSTRACT

The invention relates to a rod belt for rod belt conveyors, in particular of agricultural machines, with transverse rods (4) arranged transverse to a running direction and parallel to one another, whereby the transverse rods (4) rest on tension-proof elastic and continuous belts (3) running parallel to one another and being attached to the belts (3) by attachment at a pre-determined rod spacing.
According to the invention, it is provided that on at least one of the belts (3) a belt clip (5) is affixed via attachment (6), whereby said so attached belt clip (5) confines at least one cavity on a support surface of the respective belt (3) and at least one of the transverse rods (4) is cage-like housed in the at least one cavity in such a manner that the at least one transverse rod (4) is fixated via the belt clip (5) to the at least one belt such a manner that the at least one transverse rod (4) is fixated via the belt clip (5) to the at least one belt.

13 Claims, 4 Drawing Sheets

Figure 1A:
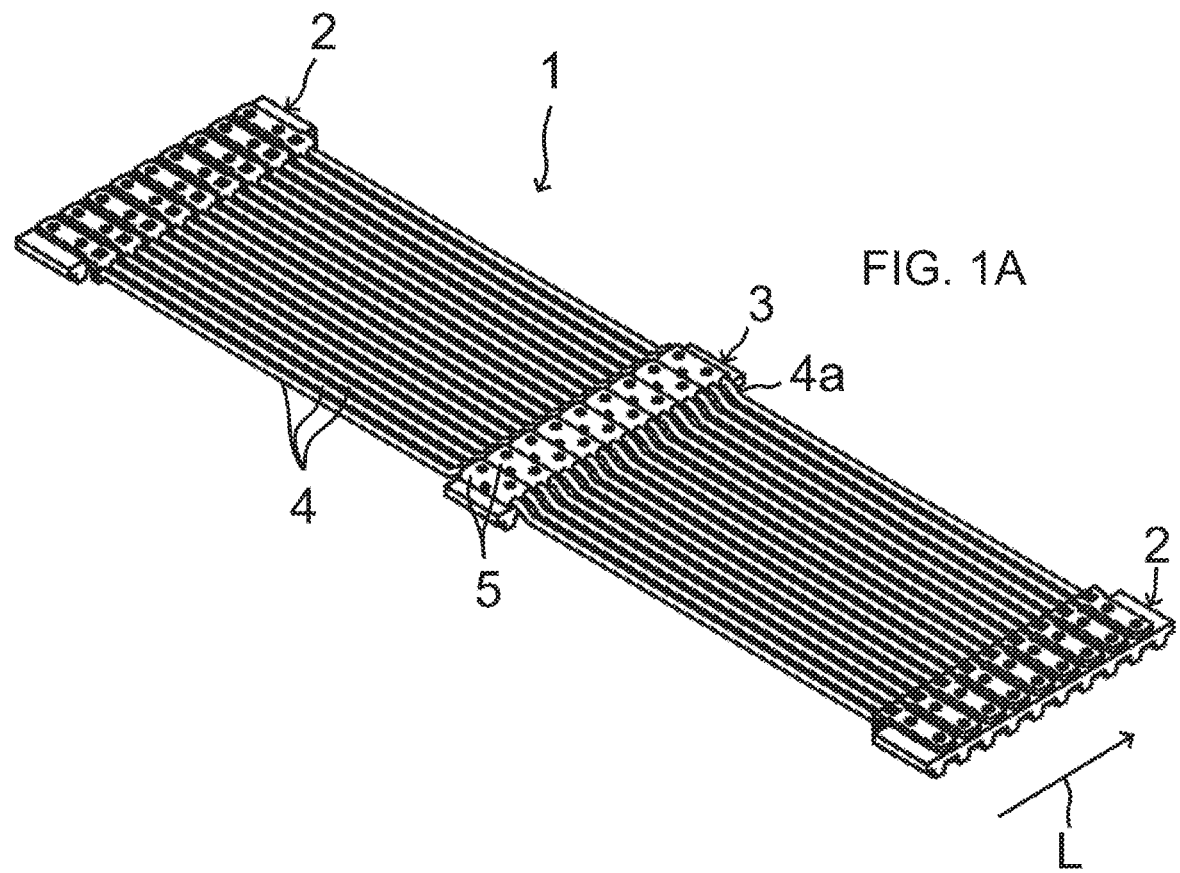

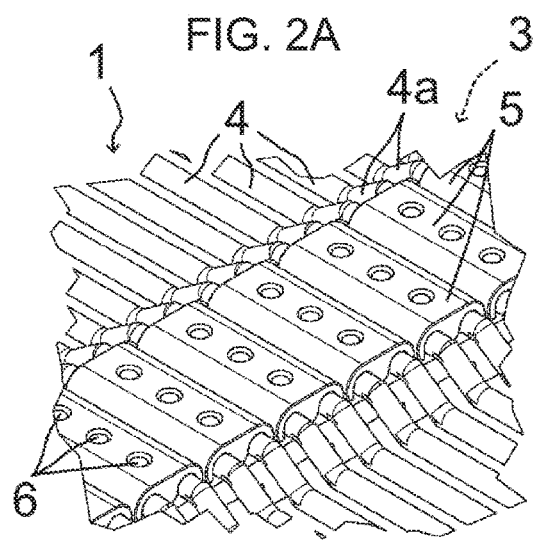
FIG. 2A
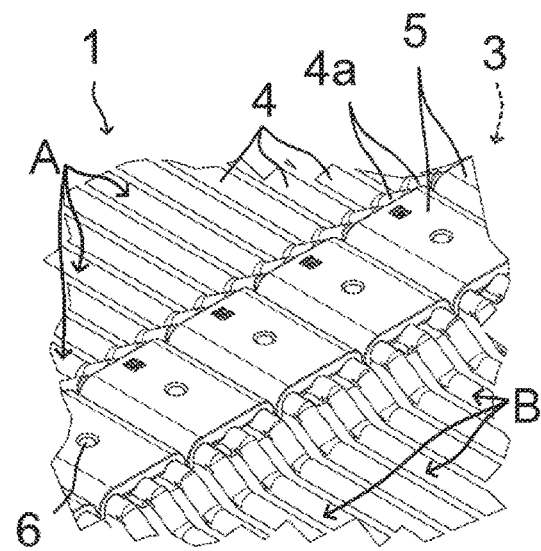
FIG. 2B
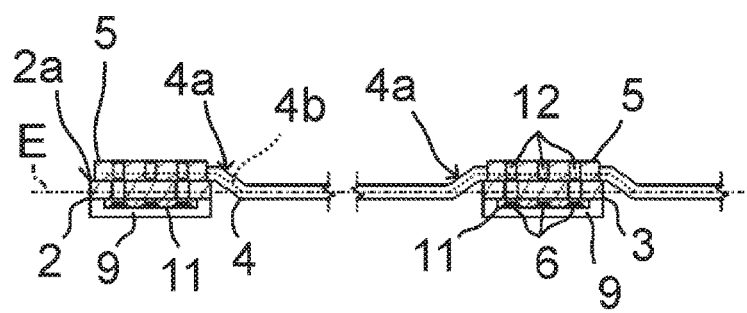
FIG. 2C
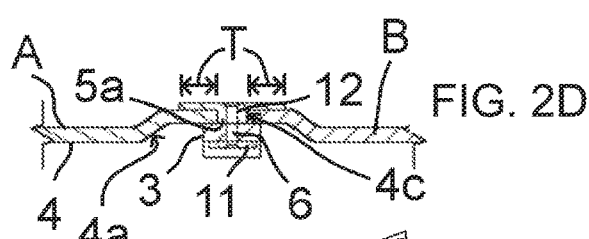
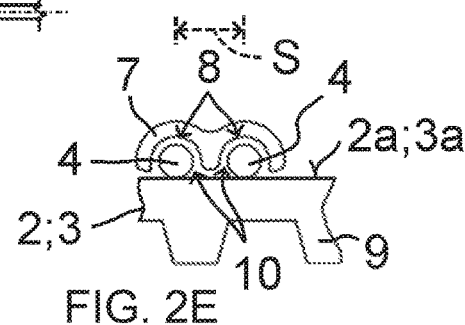
FIG. 2D
FIG. 2E
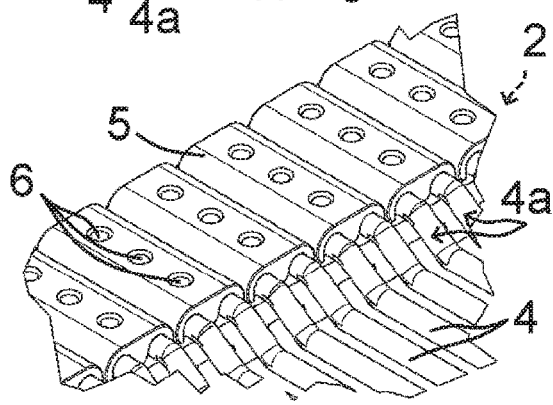
FIG. 3A
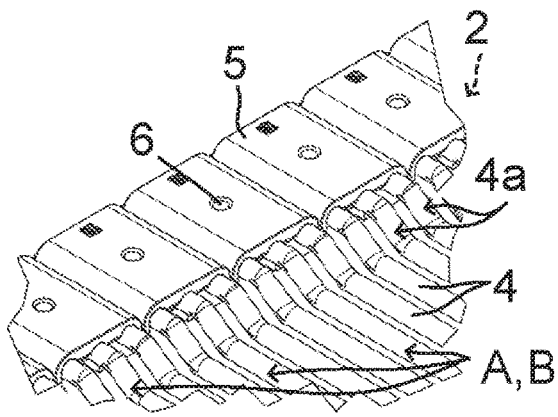
FIG. 3B

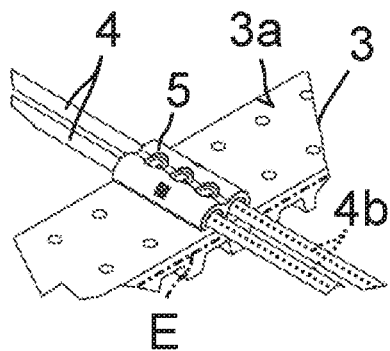
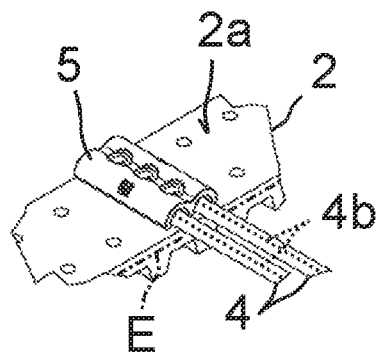
FIG. 4A  FIG. 4B
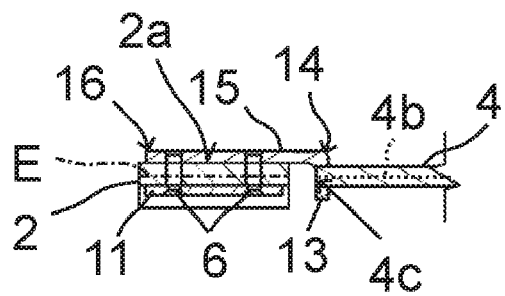
FIG. 5
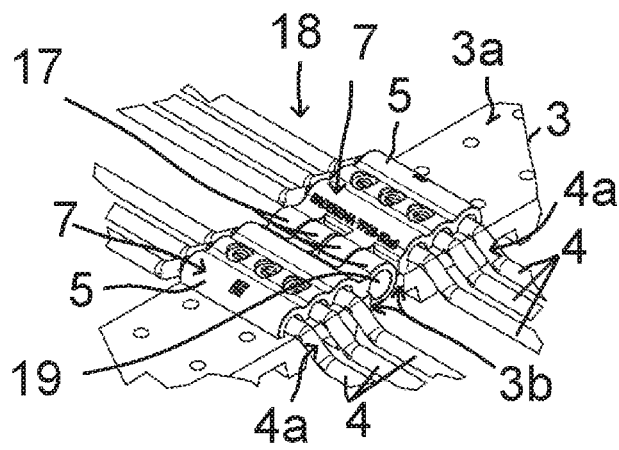
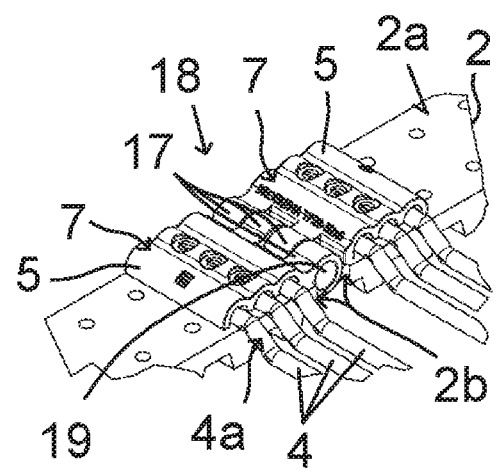
FIG. 6A  FIG. 6B

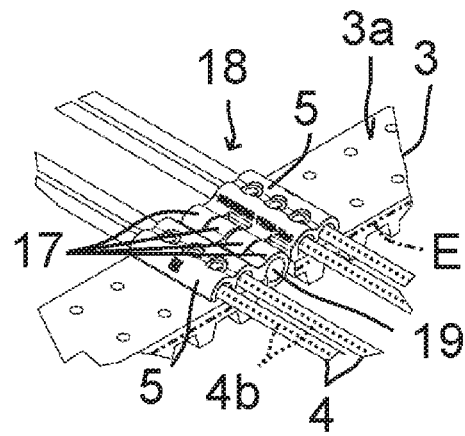
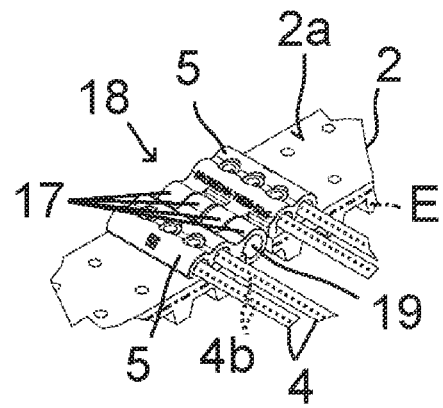
FIG. 7A　　　　　　　FIG. 7B
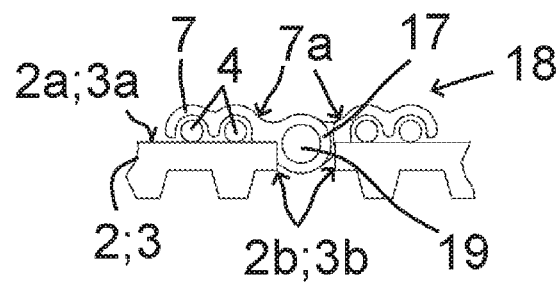
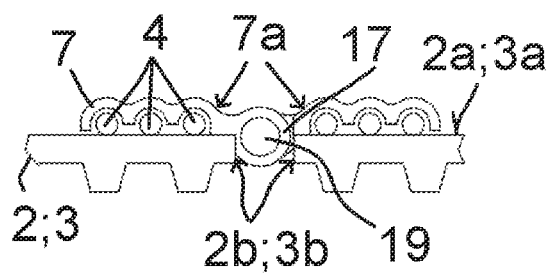
FIG. 8A　　　　　　　FIG. 8B
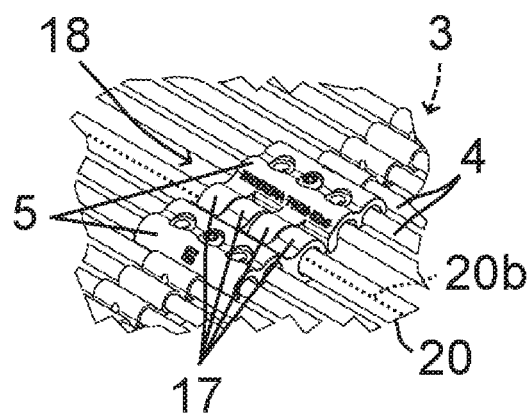
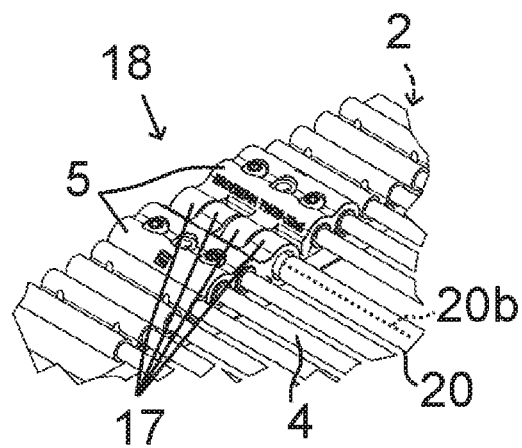
FIG. 9A　　　　　　　FIG. 9B

ROD BELT FOR ROD BELT CONVEYOR

The invention relates to a rod belt for rod belt conveyor, in particular, of agricultural machines according to the preamble of claim 1.

Conventional rod belts for rod belt conveyors of agricultural machines are designed as disclosed in the document DE 195 20 927 A1. Rod belts of this type comprise two or more tension-proof elastic and continuous belts running parallel to one another which are connected to one another by means of a multiplicity of transverse rods arranged transverse to the running direction of the rod belt and parallel to one another. For attaching the transverse rods to the belts, the transverse rods are provided with flattened and perforated support regions with which they rest on the belts. The connection of the support regions with the belts is made by means of rivets or similar attachment means which pass through the support regions and the belts.

Hereby, there exists a disadvantage in that the production of the support regions directly on the transverse rods requires a lot of effort and, as a result of the process, large tolerances appear, having a negative effect on the precision of the belts.

A further rod belt is described in the citation DE 200 11 436 U1. In this rod belt the end of the transverse rods are connected to the belts not directly, but each via an attachment piece. The attachment pieces are made from an unnotched specimen by means of forging. They comprise a flattened and perforated support region transitioning in a transition region via a cranked section to an attachment region for the ends of the transverse rods. The attachment region is formed by a cylindrical sleeve or a corresponding blind hole extending in the longitudinal direction of the transverse rods. The rods are made or plastics and are fixated by clamping inside the sleeves. The support regions of the attachment pieces rest on the upper side of the belts and are attached to these by means of rivets.

In the document EP 2 813 135 A1 a further rod belt is described in which the transverse rods are attached to the belt in groups of three via an attachment piece, for example, a bar. To that end, the transverse rods are attached to a bar at their front sides in the group of three. The bar transitions via a curvature into a flattened and perforated support region which rests on the belts. The support region is attached to the belt via attachment means, for example, screws or rivets.

Thus, the transverse rods, by virtue of the cranked section or, respectively, the angle piece can be arranged in the neutral chamfer of the belts. To that end, however, the transverse rods must be connected to further attachment pieces to allow fixation to the belts.

It is the object of the invention to provide a rod belt for a rod belt conveyor which can be manufactured easily and cost-effectively and which is designed to be variable.

This task is solved by a rod belt according to claim 1. Preferred further developments are specified in the subclaims.

Thus, according to the invention, it is provided that at least one belt clip is attached to at least one of the belts of a rod belt for rod belt conveyors via at least one attachment means, for example, a rivet or a screw, whereby said so attached belt clip confines at least one cavity or, respectively, one cage on a support surface of the respective belt and at least one of the transverse rods of the rod belt is cage-like housed or enclosed respectively in the at least one cavity in such a manner that the at least one transverse rod is fixated via the belt clip to said at least one belt. Hereby, preferably, it is provided that several belt clips are equally distributed as a function of the pre-determined rod spacing and attached on said at least one continuous belt entirely, seen in the running direction, on said at least one continuous belt so that all transverse rods are affixed to said at least one belt via belt clips.

Hereby, advantageously, a simple attachment of the transverse rods of the rod belt, running transverse to a running direction of the rod belt and parallel to one another, on the tension-proof elastic and continuous belts running parallel to one another den parallel can be guaranteed. Thus, the transverse rods can be affixed to the respective belt even without any further attachment pieces mounted thereon, simplifying the overall production of the rod belt because no elaborate additional attachment to the attachment pieces must be created. The transverse rods are merely to be placed onto the belts and can, thereafter, be held on the respective belt by introducing the attachment means via the belt clips. By virtue of a pre-determined design of the belt clips, in particular the arrangement of the cavities in relation to one another, a rod spacing of the transverse rods can be adjusted in a simple manner.

Preferably, it is provided that each belt clip is formed by a half-shell having at least one groove-like (channel-like) recess, whereby the at least one groove-like recess together with the support surface of the respective belt confines at least one cavity in which the at least one transverse rod is housed in a cage-like manner. This markedly simplifies assembly because the belt clip can be applied onto the already applied transverse rod so that the transverse rod lies inside the groove-like recess and is held bit this after being fixated by means of the attachment means. Hereby, preferably, each groove-like recess is associated with exactly one transverse rod and the groove-like recesses running within one belt clip and/or across several belt clips are spaced apart as a function of the pre-determined rod spacing so that the spacing of the transverse rods can be set in a simple manner by means of the design of the belt clip.

Hereby, the rod belt may comprise at least two continuously rotating outer belts between which the transverse rods extend in one piece or in two pieces, and at least one continuously rotating inner belt, whereby at least one of said transverse rods is affixed to the outer belt and/or on at least one inner belt via the at least one belt clip. This can guarantee a stability of the transverse rods even in the case of wide rod belts. In order to simplify assembly and production it is provided that der the at least one transverse rod, when affixed to said belt and when designed as a one-piece transverse rod, passes through the belt clip completely across the cavity, thereby extending entirely between the two outer belts. When designed as a two-piece transverse rod, the two parts of the transverse rod submerge into the belt clip into a cavity from different sides at a depth of penetration. Thus, the respective transverse rod exhibits a break between the two outer belts so as to create space e.g. for an attachment means by which the belt clip is attached to the inner belt.

Preferably, the at least one can be attached at least to the outer belts via a belt clip or an attachment piece, said attachment piece, preferably an angle piece, comprising a support region by means of which said attachment piece rests on the support surface of the outer belt, and a bar angled towards the underside of the belt from the plane of the support region, referring to the orientation when assembled, on which the at least one transverse rod is attached at one front face. Thus, the attachment of the transverse rods via a belt clip can also be connected to other attachment options so as to attain a variable design adapted to the respective application. Thus, for example, another type of attachment may be chosen on the inner belt than on the outer belt. Also, on the open ends of the belts another attachment may be chosen than distributed across the circumference of the belts.

Preferably, it is further provided that the at least one transverse rod comprises, adjacent the belt to which it is affixed via a belt clip, a cranked transition region so that the longitudinal axis of the at least one transverse rod extends between the belts, at least in part, in the belt plane. Thus, the longitudinal axis which, in the region of the belt, rests above or below the belt plane der on the respective belt, is shifted to the belt plane or, respectively, the neutral plane. This helps to reduce the load on the belts by moments and forces acting on the transverse rods.

Preferably, it is further provided that each of the at least one belt clips fixes two ("twin-rod" design) or three ("triple-rod" design) transverse rods on the respective belt in accordance with the rod spacing. This simplifies assembly because with each belt clip several transverse rods can be fixed in their positions. In principle, it is possible to fix more than three transverse rods at the respective rod spacing.

In accordance with a preferred embodiment it is provided in the rod belt at least two belt clips are provided, whereby said at least two belt clips, besides each affixing at least one transverse rod to the respective belt, form a belt lock for closing open ends of the respective belt. To that end, the two belt clips are affixed to the respective belt in the region of the open ends and are each provided with bearing eyes at their front faces, which bearing eyes are joined together in the manner of a hinge and lie in alignment with one another, whereby a bearing means is inserted in said bearing eyes so that the bearing eyes of both belt clips are pivoting held together thereby closing the open ends of the belt are creating a continuous circulating belt.

Thus, the belt clips can be utilized also for an additional functionality so as to save space and reduce assembly effort. This increases the available space in which the pre-determined rod spacing can be maintained.

Hereby, preferably, it is provided that that the bearing means is an inserted bearing pin or a connecting crossbar extending between the belts. Advantageously, by virtue of the connecting crossbar the rod spacing can be maintained approximately in the region of the belt lock. This avoids open gaps in the rod belt.

Figure 1B:
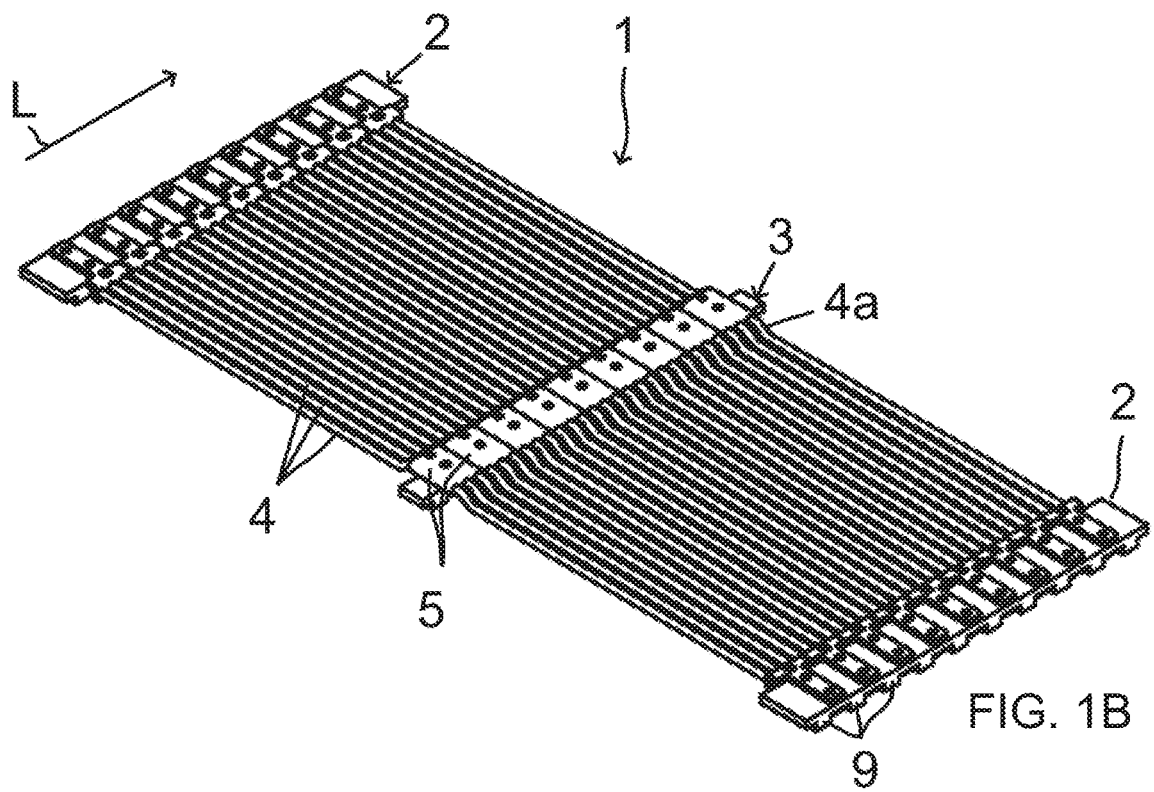

The invention is subsequently further illustrated by means of several embodiment examples. The drawing shows in:

FIG. 1A a section of a rod belt with transverse rods arranged in pairs;

FIG. 1B a section of a rod belt with transverse rods arranged in a group of three;

FIGS. 2A, B perspective views of a belt clip for attaching the transverse rods to an inner belt in a rod belt according to FIG. 1A or 1B respectively;

FIGS. 2C, D, E sectional views of the belt clip according to FIG. 2A or 1B respectively;

FIG. 3A, B perspective views of a belt clip for attaching the transverse rods to an outer belt in a rod belt according to FIG. 1A or 1B respectively;

FIG. 4A, B an alternative option for affixing the transverse rods arranged in pairs to the inner belt or, respectively, to the outer belt of the rod belt according to FIG. 1A via a belt clip;

FIG. 5 an alternative option for affixing the transverse rods to the outer belt of the rod belt according to FIG. 1A or 1B respectively;

FIGS. 6A, B perspective views of a belt clip for attaching transverse rods with an added functionality as a belt lock for closing an inner belt or, respectively, an outer belt open on both sides;

FIG. 7A, B further views of the belt clip for closing an inner belt or, respectively, an outer belt open on both sides;

FIG. 8A, B sectional views of the belt clips for closing an inner belt or, respectively, an outer belt open on both sides; and FIG. 9A, B further views of the belt clip for closing an inner belt or, respectively, an outer belt open on both sides.

The FIGS. 1A and 1B each show a segment of a rod conveyor 1 as it may be utilized in any rod belt conveyor for agricultural machines. The rod belts 1 each exhibit three tension-proof elastic belts 2, 3 running parallel to one another made of a fabric reinforced polymer which are each joint in an endless manner and circulate on driven rollers. The belts 2, 3 are connected to one another by means of a multiplicity of transverse rods 4 arranged transverse to a running direction L of the rod belt 1 and parallel to one another. The embodiments shown differ in that the transverse rods 4 in FIG. 1A are combined in pairs (twin-rod) and in FIG. 1B in a group of three (triple-rod), whereby the grouping is determined by the mounting of the transverse rods 4 on the belts 2, 3 via a belt clip 5.

The FIGS. 2A (twin-rod) and 2B (triple-rod) show the mounting of the transverse rods 4 in the respective grouping for the inner belt 3 and the FIGS. 3A (twin-rod) and 3B (triple-rod) for the outer belts 2 of the rod belt 1 in a detailed view, wherein the belts 2, 3 themselves are hidden by the belt clip 5 arranged in a row.

According to the FIGS. 2A and 3A, for the twin-rod version a belt clip 5 is provided which is affixed to the belt 2, 3 lying underneath it via three attachment means 6, for example, rivets or screws. According to the sectional view in FIG. 2E, the belt clip 5 is designed in the shape of a half-shell 7 having two groove-like recesses 8. When the half-shell 7 is attached to the belt 2, 3 the groove-like recesses 8 together with a support surface 2a, 3a of the respective belt 2, 3 confine a cavity 10. Each cavity 10 receives a transverse rod 4 which is held, when the belt clip 5 is affixed via the attachment means 6, by the half-shell 7 on the respective belt 2, 3 in a cage-like manner. Hereby, the transverse rod 4 can be held inside the cavity 10 by a clamping effect. In the FIGS. 2A, 3A and 2E, two transverse rods 4 are held or, respectively, clamped by a belt clip 5 in a cage-like manner, whereby a rod spacing S of the rod belt 1 can be determined by means of the spacing of the cavities 10 or, respectively, the transverse rods 4 in relation to one another.

According to the embodiments depicted in the FIGS. 2A and 3A, the transverse rods 4 are angled downwards or, respectively, cranked in a transition region 4a on both sides (FIG. 2A) or on one side (FIG. 3A) of the belt clip 5. This is shown in greater detail in the sectional view according to FIG. 2C. Thus, the neutral axis of the belts 2, 3 defines a belt plane E (indicated by a dotted line). A longitudinal axis 4b (dotted) of the transverse rod 4 extends between the transition regions 4a in the belt plane E. In the region in which the transverse rod 4 is guided across the support surface 2a, 3a of the respective belt 4 the longitudinal axis 4b lies above this belt plane E.

The bending of the transverse rods 4 in the transition region 4a serves for shifting the transverse rods 4 between the belts 2, 3 into the neutral axis of the belts 2, 3 thereby reducing the load on the belts 2, 3 by moments and forces acting on the transverse rods 4. Via the belt clips 5 it is possible for the cranked transverse rods 4 to rest with one side directly on the support surface 2a, 3a and to be attached to the belt 2, 3 without having to connect the transverse rod 4 to further attachment pieces. Hereby, the bending in the transition region 4a is so steep that a large usable width of the transverse rods 4 in the belt plane E is provided.

As can be also seen in the sectional view of FIG. 2C, the attachment means 6 run in the belt clip 5 or, respectively, in the half-shell 7 and pass through the respective belt 2, 3, with an attachment plate 11 being provided on the underside of the respective belt 2, 3. The attachment means 6 are inserted e.g. from below through the attachment plate 11 into the perforated belt 2, 3 and screwed or riveted into corresponding attachment apertures 12 on the belt clip 5.

A transverse rod 4 affixed to the belt 2, 3 in this way may run through the belt clip 5 across its entire width (see FIG. 2C) or merely submerge into it at a certain depth of penetration T (see FIG. 2D). Hereby, the depth of penetration T is chosen such that the transverse rod 4 in operation of the rod belt 1 is securely held on the respective 2, 3 by the belt clip 5. In the case of full penetration of the belt clip 5 a transverse rod 4 can extend fully between the two outer belts 2 of the rod belt 1 and, at the same time, be held effectively on the inner belt 3 via a belt clip 5. This is the case with the "twin-rod" design according to the FIGS. 2A, 2C, 3A.

The embodiment according to the FIGS. 2B, 2D and 3B differs from the above-described embodiment mainly in that each belt clip 5 holds three transverse rods 4 ("triple-rod" design) in cranked form. To that end, three groove-like recesses 8 are provided for each belt clip 3, in a way similar as in FIG. 2E, so that the half-shell 7 and the respective support surface 2a, 3a form three cavities 10 side by side. Due to the fact that in such a belt clip 5 houses three transverse rods 4 it is not possible, without further adaptations, to attach the belt clip 5 to the respective belt 2, 3 via an attachment means 6 in the middle region of the belt clip 5, without also penetrating the middle transverse rods 4 housed here with the attachment means 6.

In order to avoid this, the transverse rod 4 which is held in the middle in a belt clip 5 of the "triple-rod" construction is designed to be in two pieces. This can be seen in detail in the sectional view in FIG. 2D. The belt clip 5 is affixed to an inner belt 3 merely via one attachment means 6 so that the inner belt 3 may also be designed more narrow than the inner belt 3 according to FIG. 2C with three attachment means 6. On both sides of the belt clip 5 always one part A, B of the then two-piece transverse rod 4 submerges into the belt clip 5 at the depth of penetration T, whereby the depth of penetration T is dimensioned such that sufficient space is provided for the attachment means 6. In addition, as shown in FIG. 2D, the belt clip 5 cam comprise a bridge 5a in the middle region which parts the middle groove-like recess 8 and through which the attachment aperture 12 runs. Hereby, the bridge 5a rests on the support surface 3a on the inner belt 3 so as to determine a stop for the attachment.

At the same time, the depth of penetration T is adapted to the width the middle belt 3 in order to guarantee that a sufficiently deep cavity 10 can be formed between the support surface 3a and the groove-like recesses 8 in the half-shell 7 to suitably receive in a cage-like manner or, respectively, clamp the parts A, B of the two-piece transverse rod 4. Preferably, the front faces 4c of the parts A, B of the two-piece transverse rod 4 are in contact with the bridge 5a. It is also possible, however, to allow for a certain tolerance. Additionally, the belt clip 5 may project slightly beyond the inner belt 3 on both sides so as to be able to at least stabilize the two-piece transverse rod 4 across a larger width.

Thus, in this "triple-rod" construction, two parts A, B of a transverse rod 4 split in two pieces in the region of the belt 3 extend between the two outer belts 2 at regular intervals (in relation to the running direction L). Since, in this embodiment, no further attachment means 6 am belt clip 5 is provided (see FIGS. 2B, 3B), the other two transverse rods 4 held by the belt clip 5 may run between the outer belts 2, thereby fully penetrating the belt clip 5 via the cavity 10.

In a similar manner, the belt clips 5 of the "triple-rod" construction on the outer belt 2 are designed, whereby the respective part A, B of the transverse rod 4 which is located in the middle of the belt clip 5 penetrates from one side at a depth of penetration T into the corresponding provided cavity 10 and is held in a cage-like manner or clamped respectively therein. Thus, the middle transverse rod 4 is shortened compared to the "twin-rod" design according to FIG. 3A.

The FIGS. 4a and 4b show in an exemplary manner that, in principle, the attachment of the transverse rods 4 to the belts 2, 3 can be carried out in that the longitudinal axis 4b of the transverse rods 4 lies continuously above the belt plane E. Thus, it is not necessary for the transverse rods 4 to be provided with a cranked transition region 4a in order to be fixed on the belt clips 5. In FIGS. 4A and 4B, merely the "twin-rod" construction is indicated which, however, can be applied also to the "triple-rod" construction in an analog manner.

FIG. 5 shows an alternative attachment variant for the attachment of the transverse rods 4 to the outer belts 2. According to this, the front face 4c of the transverse rods 4 are attached to a strip 13 which transitions, via a curvature 14, into a flattened and perforated support region 15. The flattened support region 15 rests on the support surface 2a on the outer belt 2. Via attachment means 6, e.g. screws or rivets, the perforated support region 15 is attached to the outer belt 2. Hereby, the support region 15, the curvature 14 and the strip 13 form an attachment piece 16 via which, depending on the grouping of the transverse rods 4, either two or three transverse rods 4 can be attached to the outer belt 2. To that end, the strip 13 is designed to be suitably wide so as to be able to accommodate two or three transverse rods 4 with their front faces 4c side by side. Via the curvature 14 it is possible by means of this attachment piece 16, too, to attain a shifting of the longitudinal axis 4b of the transverse rods 4 into the belt plane E.

In the FIGS. 6A and 6B a further possible functionality of the belt clips 5 is shown. According to this, it is possible to utilize two belt clips 5 additionally as a belt lock 18. The belt lock 18 serves for closing a belt 2, 3 with open ends 2b, 3b to thereby make it continuously rotating. To that end, the belt clips 5 are affixed on the respective belts 2, 3 in the region of the open ends 2b, 3b. The two belt clips 5 shown each hold, in the manner described above, three transverse rods 4 cranked in the transition region 4a, through their cavities 10, in a cage like-manner or, respectively, by a clamping effect on the inner belt 3 (s. FIG. 6A) or, respectively, the outer belts 2 (see FIG. 6B).

In addition, the half-shells 7 of the respective belt clips 5 each exhibit bearing eyes 17 on a front face 7a (see FIGS. 8A, 8B) projecting beyond the open ends 2b, 3b of the belt 2, 3. The bearing eyes 17 of the two belt clips 5 are arranged in relation to one another in such a way that these bearing eyes 17 can mesh in the manner of a hinge and lies in alignment with each other. This makes it possible to push a bearing pin 19 through the bearing eyes 17 of the belt clips 5 thereby holding the two belt clips 5 and, therewith, the two open ends 2b, 3b of the respective belt 2, 3, too, permanently together. This creates continuously joined belts 2, 3 that can rest on driven rollers (not shown) in order to drive the rod belt 1 including the transverse rods 4 along the running direction T.

Hereby, the belt lock 18 can be utilized not only in the "triple-rod" design with cranked transverse rods 4, as shown, but also in a "twin-rod" configuration. As can be seen in the FIGS. 7A and 7B, even an embodiment without cranked transition regions 4a is possible so that the longitudinal axis 4b of the transverse rod lies above the belt plane E across the entire width.

According to a further embodiment which is shown in the FIGS. 9A, 9B, the bearing eyes 17 in an embodiment of the belt clips 5 as belt lock 18 are not held together by a bearing pin 19. Rather, a special attachment transverse rod 20 is provided which is inserted through the aligned bearing eyes 17 of the belt clips 5 both on the inner belt 3 as well as on the outer belt 2. This makes it possible, in contrast to an embodiment with a bearing pin 19, for no gap to appear between the transverse rods 4 held by the belt clips 5 forming the belt lock 18. Hereby, the rod belt 1 is closed across its entire circumference of transverse rods 4, 20 at about the same rod spacing S so that no usable area is wasted. In addition, the FIGS. 9A and 9B show an alternative attachment of transverse rods 4 on the respective belt 2, 3 in the region next to the belt clips 5 of the belt lock 18. According to this, an attachment of the transverse rods 4 via the belt clips 5 of the belt lock 18 can be combined with other attachment options at will, for example, also with the attachment pieces 16 according to FIG. 5.

In principle, this embodiment variation shown here, too, is not limited to the "twin-rod" design. Even a cranked transition region 4a can be provided in the transverse rods 4 both in the "twin-rod" as well as the "triple-rod" design. The connecting transverse rod 20, too, may comprise a comparable cranked transition region in order to shift the longitudinal axis 20b thereof into the belt plane E.

All embodiments mentioned attain the advantage then, when using a cam belt as belt 2, 3 the rod spacing S, i.e. the distances of the transverse rods 4 in relation to one another, can be chosen independently from the cam spacing, i.e. the distances of cams 9 on an underside of the belts 2, 3. Hereby, the cams 9 serve to transmit the rotations movement of a toothed drive wheel (not shown) onto the rod belt 1 without the danger of spinning of the rod belt 1 in case of high load.

The independence from the cam spacing follows from the fact that the transverse rods 4 can be affixed to the respective belt 2, 3 via the belt clips 5 in their chosen grouping independent of the arrangement of the cams 9. This is the case even when the described attachment plates 11 are arranged in a gap between two cams 9 because, in this case, the rod spacing S can be adjusted almost freely via a corresponding arrangement of the groove-shaped recesses 8 or the cavities 10 respectively. In principle, however, the attachment of the belt clips 5 on the respective belt 2, 3 can happen independent of the location of the cams 9 (see e.g. FIGS. 2E or 8A).

In principle, however, flat belts without cams 9 can be utilized as belts 2, 3, wherein the rod spacing S can also be chosen freely by the design and attachment of the belt clips 5.

The invention claimed is:

1. A Rod belt for rod belt conveyor, used in agricultural machines, comprising:

transverse rods arranged transverse to a running direction and parallel to one another, said transverse rods resting on tension-proof elastic and continuous belts and running parallel to one another and being attached to the belts by attachment means at a pre-determined rod spacing;

wherein, at least one belt clip is attached via at least one of the attachment means to at least one of said belts wherein said belt clip confines at least one cavity on a support surface of the respective belt and at least one of said transverse rods is housed or enclosed respectively in the at least one cavity in such a manner that said at least one transverse rod is fixated via said belt clip to said at least one belt; and wherein each of the at least one belt clips fixes two or three transverse rods on the respective belt in accordance with the rod spacing.

2. The Rod belt according to claim 1, wherein each of the at least one belt clip is formed by a half-shell having at least one groove-like recess, whereby said at least one groove-like recess together with said support surface of the respective belt confines the at least one cavity in which said at least one of said transverse rods is housed.

3. The Rod belt according to claim 2, wherein each of the groove-like recess is associated with one of the transverse rod and said groove-like recesses within one of the at least one belt clips and/or across several of the at least one belt clip are spaced apart as a function of the rod spacing.

4. The Rod belt according to claim 2, wherein several of the at least one belt clip are equally distributed as a function of the rod spacing and attached to said at least one belt entirely along the running direction, so that all of the transverse rods are affixed to said at least one belt via the at least one belt clip.

5. The Rod belt according to claim 4, further comprising at least two continuously rotating outer belts between which said transverse rods extend in one piece or in two pieces, and at least one continuously rotating inner belt, whereby at least one of said transverse rods is affixed to said at least two outer belts and/or on the at least one inner belt respectively via at least one of the belt clips.

6. The Rod belt according to claim 5, wherein at least one of the transverse rods, when affixed to said at least two outer belts and/or said at least one inner belt and when designed as a one-piece transverse rod, passes through the belt clip completely across said cavity or, when designed as a two-piece transverse rod, the two parts of said transverse rod submerge into said belt clip into a cavity from different sides at a certain depth of penetration.

7. The Rod belt according to claim 6, wherein the depth of penetration is chosen such that an attachment means can be inserted into said belt clip between front faces of said parts of said two-piece transverse rod inserted into said belt clip from opposing sides.

8. The Rod belt according to claim 7, wherein said attachment means runs through a bridge separating said two front faces.

9. The Rod belt according to claim 8, wherein said at least one transverse rod is attached at least to said outer belts via one of the belt clips or an attachment piece, said attachment piece, comprising a support region by means of which said attachment piece rests on said support surface of said at least two outer belts, and a bar angled towards the underside of said at least two outer belts, from the plane of said support region, referring to the orientation when assembled, on which said at least one transverse rod is attached at one front face.

10. The Rod belt according to claim 9, wherein a longitudinal axis of said at least one transverse rod rests on the respective belt, in the region of the belt where said at least one transverse rod is affixed via one of the belt clips, above or below a belt plane defined by the neutral axis of the respective belt.

11. The Rod belt according to claim 10, wherein said at least one transverse rod comprises, adjacent to said at least two outer belts and/or said at least one inner belt to which it is affixed via one of one belt clips, a cranked transition region so that the longitudinal axis of said at least one transverse rod extends between the belts, at least in part, in the belt plane.

12. The Rod belt according to claim 11, wherein at least two of the belt clips are provided for one of said at least two outer belts and/or of said at least one inner belt, whereby said at least two belt clips affixing at least one of the transverse rods to the respective belt form a belt lock for closing open ends of the respective belt; and wherein said two belt clips are affixed to the respective belt in the region of the open ends and are each provided with bearing eyes at their front faces, said bearing eyes being joined together in the manner of a hinge and lie in alignment with one another, whereby a bearing means is inserted in said bearing eyes so that said open ends are closed and a continuous circulating belt is created.

13. The Rod belt according to claim 12, wherein said bearing means is an inserted bearing pin or a connecting crossbar extending between the belts.

\* \* \* \* \*